United States Patent [19]

Schmidt et al.

[11] Patent Number: 5,055,551
[45] Date of Patent: Oct. 8, 1991

[54] PROCESS FOR THE PRODUCTION OF HIGH MOLECULAR WEIGHT, OPTIONALLY BRANCHED POLYARYLENE SULFIDES HAVING REDUCED CONTENT OF EXTRACTABLE OLIGOMERS

[75] Inventors: Manfred Schmidt; Wolfgang Arlt; Erhard Tresper; Wolfgang Rüsseler, all of Krefeld, Fed. Rep. of Germany

[73] Assignee: Bayer Aktiengesellschaft, Leverkusen, Fed. Rep. of Germany

[21] Appl. No.: 434,317

[22] Filed: Nov. 13, 1989

[30] Foreign Application Priority Data

Nov. 23, 1988 [DE] Fed. Rep. of Germany ....... 3839441

[51] Int. Cl.$^5$ .......................... C08G 2/00; C08G 4/00; C08G 75/14
[52] U.S. Cl. .................................... 528/388; 528/226
[58] Field of Search ................................ 528/388, 226

[56] References Cited

U.S. PATENT DOCUMENTS 3,354,129 11/1967 Edmonds, Jr. et al. ............ 528/265

FOREIGN PATENT DOCUMENTS 0280271 8/1988 European Pat. Off. .

*Primary Examiner*—Harold D. Anderson
*Assistant Examiner*—T. Mosley
*Attorney, Agent, or Firm*—Connolly & Hutz

[57] ABSTRACT

This invention relates to a process for the production of high molecular weight, optionally branched polyarylene sulfides having a reduced content of extractable oligomeric constituents. They are prepared by reaction of alkali sulfides and/or alkali hydrogen sulfides with aromatic dihalogen compounds in a polar organic solvent.

12 Claims, No Drawings

PROCESS FOR THE PRODUCTION OF HIGH MOLECULAR WEIGHT, OPTIONALLY BRANCHED POLYARYLENE SULFIDES HAVING REDUCED CONTENT OF EXTRACTABLE OLIGOMERS

This invention relates to a process for the production of high molecular weight, optionally branched polyarylene sulfides, preferably polyphenylene sulfide (PPS), having a reduced content of extractable oligomeric constituents. They are prepared by reaction of alkali sulfides and/or alkali hydrogen sulfides with aromatic dihalogen compounds in a polar organic solvent.

Polyarylene sulfides (PAS) and their production are known (cf. for example U.S. Pat. No. 3,354,129, Ep-A 171 021).

pAS's are high-temperature-resistant polymers. They are mainly used in the electrical and electronics field. Applications such as these impose stringent demands on the purity and stability of a polymer.

The polyarylene sulfides, which are formed with elimination of alkali halides, can contain extractable low molecular weight oligomers.

Polyarylene sulfides having high contents of extractable oligomers can give rise to disadvantages in injection molding, for example in the production of glass-fiber-filled or mineral-filled compounds, for example to surface faults in moldings. During processing to moldings, so-called flashes can form at the edge of the moldings due to increased melt flow of the oligomeric components in the thermoplastic melt. In addition, a high proportion of reactive terminal groups, such as terminal SH and Cl groups, can be present in the polymer, resulting in increased elimination of HCl and in an increased electrolyte content during molding.

It is known from EP-A 215 259 that low molecular weight oligomers can be extracted (for example with methylene chloride).

It is known from EP-A 240 016 that solid polymer precipitated can first be separated off from the reaction medium and then washed repeatedly with the same solvent used for the reaction at temperatures of at least 50° C. Oligomeric components can be extracted at the same time.

It has now been found that polyarylene sulfides, preferably polyphenylene sulfide, can be obtained by a process in which the polymers obtained contain less than 2.1% by weight oligomeric components extractable with methylene chloride. They have a uniform molecular weight (minimal non-uniformity of the molecular weight distribution curve) and contain less than 5 ppm inorganic chlorine.

The present invention relates to a process for the production of high molecular weight, optionally branched polyarylene sulfides, preferably polyphenylene sulfides, from a) one or more (hetero)aromatic dihalogen compounds corresponding to formulae (I) and/or (II)

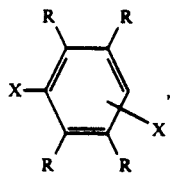
(I)

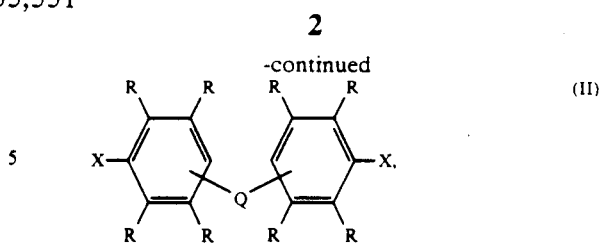

in which
X is halogen, such as chlorine or bromine,
the R's may be the same or different and represent hydrogen, $C_{1-20}$ alkyl, $C_{4-20}$ cycloalkyl, $C_{6-24}$ aryl, $C_{7-24}$ alkylaryl and $C_{7-24}$ arylalkyl; two substituents R in the ortho position to one another may be attached to form an aromatic or heterocyclic ring containing up to 3 hetero atoms, such as N, O or S, and Q represents a chemical bond, groups with two bonds, such as —Ar—, —O—, —S—, —SO—, —SO$_2$—, —(CR$_2$)$_m$—, —CO—, —CO—Ar—CO—, —CO—NH—, —CO—NH—Ar—NH—CO—, where R is as defined above, Ar is a $C_{6-24}$ aromatic radical with two bonds and m is an integer of 1 to 24, and b) 0 to 5 mol-% and preferably 0 to 1.25 mol-%, based on the sum of the aromatic dihalogen compounds of formula (I) and/or (II), of an aromatic trihalogen or tetrahalogen compound corresponding to formula (III)

$$ArX_n \qquad (III),$$

in which
Ar is an aromatic or heterocyclic radical containing 6 to 24 ring atoms, up to 3 ring C atoms being replaceable by heteroatoms, such as N, O, S,
X represents halogen, such as bromine or chlorine, and
n is the number 3 or 4, and c) 50 to 100 mol-% alkali sulfide, such as sodium or potassium sulfide, and 0 to 50 mol-% alkali hydrogen sulfide, such as sodium or potassium hydrogen sulfide, the molar ratio of (a+b):c being from 0.75:1 to 1.15:1 and preferably from 0.90:1 to 1.1:1, d) in an organic solvent, optionally in the presence of catalysts and/or co-solvents, characterized in that the molar ratio of c) to the organic solvent d) is in the range from 1:1.9 to 1:1.0 and preferably in the range from 1:1.8 to 1:1.3 and the reaction is carried out by mixing of aqueous alkali sulfide and/or alkali hydrogen sulfide solutions with solutions of the aromatic dihalogen compounds in an organic solvent at temperatures above 212° C., the water content of the reaction solution does not exceed 0.02% by weight and unreacted aromatic halogen compounds corresponding to formulae (I), (II) and (III) are removed from the reaction mixture either continuously or at the end of the reaction.

Examples of aromatic dihalogen compounds of formula (I) suitable for use in accordance with the invention are 1,4-dichlorobenzene, 1,4-dibromobenzene, 1-bromo-4-chlorobenzene, 1,3-dichlorobenzene, 1,3-dibromobenzene, 1-bromo-3-chlorobenzene, 2,5-dichlorotoluene, 2,5-dichloroxylene, 1,4-dichloro-2-ethyl benzene, 1,4-dibromo-2-ethyl benzene, 1,4- dichloro-2,3,5,6-tetramethyl benzene, 1,4-dichloro-2cyclohexyl benzene, 2-benzyl-1,4-dichlorobenzene, 2,4-dichlorotoluene, 2,4-dichloroxylene, 2,4-dichlorocumene, preferably 1,4-dichlorobenzene, 1,3-dichlorobenzene and 2,5-dichlorotoluene.

Examples of aromatic dihalogen compounds of formula (II) suitable for use in accordance with the invention are 4,4'-dichlorodiphenyl, 4,4'-dibromodiphenyl, 4,4'-dichlorobenzophenone, 3,3'-dichlorobenzophenone, 4,4'-dichlorodiphenyl sulfone, 1,4-bis-(4'-chlorobenzoyl)-benzene, 1,4-bis-(4'-chlorobenzoyl)-benzene, preferably 4,4'-dichlorodiphenyl, 4,4'-dichlorodiphenyl sulfone and 4,4'-dichlorobenzophenone.

The aromatic dihalogen compounds corresponding to formulae (I) and/or (II) may be used individually or in admixture with one another.

Examples of aromatic trihalogen or tetrahalogen compounds of formula (III) suitable for use in accordance with the invention are 1,2,4-trichlorobenzene, 1,3,5-trichlorobenzene, 2,2',4,4'-tetrachlorodiphenyl, 2,2',4,4'-tetrachlorodiphenyl sulfide, 1,3,5-trichlorotriazine, 1,2,6-trichloronaphthalene and tris-(4-chlorophenyl)-benzene.

The alkali sulfides are used in typical quantities and in the usual way. For example, it is possible to use sodium and potassium sulfides produced from the hydrogen sulfides with sodium or potassium hydroxide. They contain 1 to 9 mol water per mol sulfide and may be used in the form of a melt, optionally together with catalysts.

Suitable hydrogen sulfides are sodium or potassium hydrogen sulfides. They may be prepared from hydroxides and hydrogen sulfide. They may also be prepared from sulfides with hydrogen sulfide. They may contain from 1 to 4 mol water.

Organic solvents suitable for use in accordance with the invention are aprotic solvents, more especially N-alkylated lactams, for example N-methyl pyrrolidone, N-methyl piperidone, N-isopropyl pyrrolidone, N-methyl caprolactam, disubstituted cyclic ureas, for example N,N-dimethyl pyrimidazolidinone (also known as N,N-dimethyl propylene urea), N,N'-dimethyl imidazolidinone. The boiling point of the solvents is in the range from 212° C. to 280° C. and preferably in the range from 212° to 242° C. To reach the temperature range, the reaction may be carried out under a slight excess pressure (up to $10^3$ mbar).

Suitable co-solvents are, for example, N,N-dialkyl carboxylic acid amides of aliphatic $C_{1-8}$ and aromatic $C_{6-12}$ carboxylic acids which may be used in a quantity of from 0.02 to 1 mol, based on sulfide. Preferred co-solvents are N,N-dimethyl acetamide, N,N-diethyl acetamide and N,N-dimethyl propionamide.

Suitable catalysts are any of the substances typically used for this purpose, for example alkali salts, such as sodium or potassium fluorides, phosphates, carboxylates or caproates, which may be used in typical quantities, for example in quantities of from 0.02 to 1.0 mol catalyst per mol S donor.

In the practical application of the process, the solvent, the aromatic halogen compounds of formulae (I) and (II) and/or (III), optionally together with the catalysts and/or co-solvents, and the aqueous hydrogen sulfides and/or sulfides may be added to the reaction mixture simultaneously or successively. The temperature of the reaction mixture is above 212° C. The water is spontaneously removed with recycling of the aromatic halogen compounds of formulae (I), (II) and (III) which distill off azeotropically. The water content of the reaction mixture is from 0 to 0.02% by weight.

The reaction time may vary over a wide range, amounting to between less than 1 hour and several days, preferably to between 1 hour and 48 hours and more preferably to between 2 and 18 hours. Unreacted aromatic halogen compounds corresponding to formulae (I), (II) and (III) are removed from the reaction mixture, for example, by distillation.

The polyarylene sulfides are isolated, for example, by cooling, filtration and washing of the reaction mixture first with ketones, such as acetone, or alcohols, such as methanol, ethanol or isopropanol. The residue is suspended in water in a ratio of 1 part residue to 5–20 parts water, the suspension obtained is adjusted to pH 1–5 with acids, such as for example acetic acid, hydrochloric acid, phosphoric acid, sulfuric acid, and then washed with water until neutral.

The polyarylene sulfides thus prepared contain less than 2.1% by weight oligomeric components extractable with dichloromethane. They have a uniform molecular weight and contain less than 5 ppm inorganic chlorine. There is no need for the otherwise usual thermal aftertreatment under oxidizing conditions or for additional purification by extraction methods.

The melt viscosities of the polyarylene sulfides produced in accordance with the invention as a measure of their molecular weight are determined, for example, by the method described in EP-A 14 024.

To determine the extractable components, 100 g of the dried polyarylene sulfides are extracted twice with 800 ml (=1.070 g) methylene chloride and the extract is concentrated and weighed out. Residues of the solvent used during the reaction and residues of the monomers used can be determined in the extract by gas chromatography. The residue remaining after evaporation of the solvent and removal of the quantities by weight of monomers is the extractable quantity of oligomers.

The molecular weight distribution is determined, for example, by high-temperature gel permeation chromatography of a 0.05% by weight solution of the polyarylene sulfide in N-methyl caprolactam at 185° C. on columns of silica gel.

The non-uniformity $U_1$ of a polymer is defined as the difference between the quotient of the weight average molecular weight $M_w$ and the number average molecular weight $M_n$ and the number 1..

$$U_1 = \frac{M_w}{M_n} - 1$$

The contents of inorganic chlorine in the polyarylene sulfides are determined, for example, by argentometric titration.

Other inorganic or organic oligomers or polymers, pigments and fillers, for example carbon black, graphite, metal powders, glass powder, quartz powder, mica, glass and carbon fibers or fibers of other inorganic or organic materials, standard inorganic fillers from the group of metal oxides or metal sulfides, other additives, for example stabilizers and/or mold release agents, may be added to the polyarylene sulfides produced in accordance with the invention.

The polyarylene sulfides produced in accordance with the invention or mixtures thereof may be directly processed by extrusion, extrusion blow molding, injection molding or other standard molding processes to form films, moldings or fibers. The end products obtained may be typically used, for example, as automotive components, fittings, valves, ball bearing components, electrical components, for example switches, electronic boards, parts resistant to chemicals and weathering and machine parts, such as pump housings and pump flywheels, etching baths, sealing rings, parts of office machines, communications equipment, domestic appliances, etc.

The polymers produced by the process according to the invention are preferably used for the encapsulation of electronic components, such as for example transistors, diodes and microchips.

EXAMPLE 1

1008.0 g (7.937 mol) N-methyl caprolactam (NMC) and 588.0 g (4.027 mol) 1,4-dichlorobenzene are introduced into a 4 liter tank and heated to 214° C. A solution of 249.7 g (3.201 mol) sodium sulfide, 89.7 g (1.602 mol) sodium hydrogen sulfide and 4.0 g (0.0426 mol) phenol (=1 mol-%, based on 1,4-dichlorobenzene) in 367.2 g water (water content of the solution=51.7% by weight) is then introduced over a period of 4 hours with stirring and azeotropic removal of water at a temperature of the reaction mixture of 213° to 217° C. The molar ratio of mol sulfur donor (=4.803 mol) to mol solvent (=7.937 mol) is 1:1.653. The 1,4-dichlorobenzene distilling off azeotropically with the water is continuously returned to the reactor. Samples of the reaction mixture are taken after 1, 2, 3 and 4 hours and the water content determined in a methylene chloride suspension by the K. Fischer method. The water contents are always below 0.01% by weight.

The temperature of the reaction mixture is then increased. The reaction mixture is refluxed for another 8 hours during which its temperature increases to 240° C. 50 ml N-methyl caprolactam and 24.5 g 1,4-dichlorobenzene are then distilled off. The reaction mixture is precipitated with stirring in 7 kg isopropanol, salt and polymer are filtered off, the product is washed with 3 kg isopropanol to remove the solvent, N-methyl caprolactam, the residue is suspended in 3 kg water and the suspension is acidifed to pH 2 with 70% sulfuric acid. The polymer is filtered off, washed with water until free from electrolyte and dried in vacuo (pressure 50 mbar) for 12 hours at 120° C. Yield: 398.9 g (=95.7%, based on the dichlorobenzene used). Values for % by weight of the components extractable with methylene chloride, melt viscosity, inorganic Cl content and non-uniformity $U_1$ are shown comparatively in Table 1.

EXAMPLE 2

972.0 g (7.653 mol) N-methyl caprolactam and 882.0 g (6.041 mol) 1,4-dichlorobenzene are introduced under nitrogen into a reactor as described in Example 1 and heated to 213° C. A solution heated to 140° C. of 374.6 g (4.803 mol) sodium sulfide, 134.5 g (2.402 mol) sodium hydrogen sulfide and 4.5 g (0.048 mol) phenol (=0.75 mol%, based on 1,4-dichlorobenzene) in 673.2 g water (water content of the solution=56.7% by weight) is introduced over a period of 5 hours with stirring and azeotropic removal of water at a reaction temperature of 213° C. to 219° C. and the 1,4-dichlorobenzene distilling off azeotropically with the water is continuously returned to the reaction mixture. Samples of the reaction mixture are taken after 1, 2, 4 and 5 hours. The water content of the samples is below 0.01% by weight.

The ratio of mol sulfur donor (7.205 mol) to mol solvent (7.653 mol) is 1:1.062.

The temperature of the reaction mixture is increased to 230° C. over a period of 1 hour. The reaction mixture is then refluxed for another 8 hours, after which 50 ml N-methyl caprolactam and 26.2 g 1,4-dichlorobenzene are distilled off, the reaction mixture reaching a temperature of 242° C. The polymer is isolated by the method described in Example 1. Polyphenylene sulfide is obtained in a quantity of 631 g (corresponding to a yield of 96.7%, based on dichlorobenzene used). The other values determined are shown comparatively in Table 1.

EXAMPLE 3

972.0 g (7.653 mol) N-methyl caprolactam and 882.0 g (6.041 mol) 1,4-dichlorobenzene are introduced under nitrogen into a reactor as described in Example 1 and heated to 213° C. A solution heated to 140° C. of 374.6 g (4.803 mol) sodium sulfide, 134.5 g (2.402 mol) sodium hydrogen sulfide and 2.8 g (0.030 mol) phenol (=0.47 mol-%, based on 1,4-dichlorobenzene) in 673.2 g water (water content of the solution=56.7% by weight) is then introduced over a period of 5 hours with stirring and azeotropic removal of water at a reaction temperature of 213° to 220° C. The further procedure is as described in Example 2.

The ratio of mol sulfur donor (7.205 mol) to mol solvent (7.653 mol) is 1:1.062. A water content of less than 0.01% by weight is determined in samples of the reaction mixture taken after 2, 4 and 6 hours.

. 40 ml N-methyl caprolactam and 22 g 1,4-dichlorobenzene are distilled off towards the end of the reaction. Working up as in Example 2 gives 628 g polyphenylene sulfide (yield 96.2%, based on the 1,4-dichlorobenzene used). Table 1 contains the other values determined.

COMPARISON EXAMPLE 1

(Variant for direct comparison with the invention)

1382.4 g (10.885 mol) N-methyl caprolactam and 470.4 g (3.222 mol) 1,4-dichlorobenzene are introduced into a 4 liter tank as described in Example 1 and heated to 214° C. A solution of 199.8 g (2.562 mol) sodium sulfide, 71.8 g (1.282 mol) sodium hydrogen sulfide and 3.0 g (0.032 mol) phenol (=1 mol-%, based on 1,4-dichlorobenzene) in 293.8 g water (water content of the solution=51.7% by weight) is then introduced over a period of 4 hours with stirring and azeotropic removal of water at a reaction temperature of 214° to 220° C. The further procedure is as described in Example 1.

The ratio of mol sulfur donor (3.844 mol) to mol solvent (10.885 mol) is 1:2.84. A water content of less than 0.1% is determined in samples of the reaction mixture taken after 1, 2, 3 and 5 hours.

50 ml N-methylcaprolactam and 13.8 g 1,4-dichlorobenzene are distilled off towards the end of the reaction. Working up as in Example 1 gives 335.8 g polyphenylene sulfide (yield 96.5%, based on 1,4-dichlorobenzene used). Table 1 shows the other values determined.

COMPARISON EXAMPLE 2

(Variant for direct comparison with the invention)

Example 4 of EP-A 240 016 was copied in a 4 liter stirred autoclave.

Quantities weighed in: 218.4 g (2.8 mol) sodium sulfide, 3.46 g (0.0865 mol) sodium hydroxide, 840.0 g (7.706 mol) N-methyl pyrrolidone (NMP), 148.3 g water.

After dehydration with distillation of 312 g aqueous NMP (including 145 g water), 411.6 g (2.819 mol) 1,4-dichlorobenzene, 0.5 g (2.75 mmol) 1,2,4-trichlorobenzene and 140.0 g (1.284 mol) NMP are added at 170° C. The further procedure is as in Example 4 of EP-OS 240 016, working up also being carried out in the same way. The molar ratio of sulfur donor (2.8 mol) to solvent (7.458 mol) in this case is 1:2.66. Polyphenylene sulfide is obtained in a quantity of 295.3 g (yield 97%, based on 1,4-dichlorobenzene used). Table 1 shows the values determined.

The melt viscosity of the polyphenylene sulfide obtained in accordance with Comparison Example 2 was not measured after heat treatment in air at 260° C. as in EP-A 240 016 (cf. the method used to measure melt viscosity in Example 1 of EP-A 240 016), because this method results in a build up of molecular weight due to crosslinking of the oligomer. For comparison with Examples 1 to 3 according to the invention and Comparison Examples 1 and 3, melt viscosity was measured after drying under nitrogen at 120° C. (12 hours, 50 mbar vacuum), so that the polymer properties can be compared without falsification. Accordingly, the proportion by weight of components extractable with methylene chloride is also distinctly higher than the 1.3% by weight of Example 4 of EP-A 240 016 because partial thermal oxidative crosslinking of low molecular weight oligomeric components, which reduces the extractable component, is avoided here (cf. Table 1).

COMPARISON EXAMPLE 3

(Variant for direct comparison with the invention)

Example 1 of EP-A 215 259 was copied. The molar ratio of sulfur donor (4.8 mol) to solvent (2000 ml NMC=2000 g=15.748 mol) is 1:3.28.

Working up as in Example 1 of the present application gives 451.4 g polyphenylene sulfide (corresponding to a yield of 95%, based on 1,4-dichlorobenzene used).

Table 1 shows the other values determined.

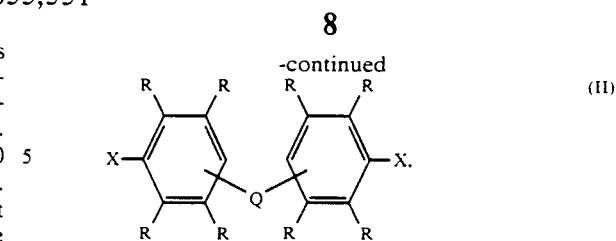

in which

X is halogen, the R's are the same or different and represent hydrogen, $C_{1-20}$ alkyl, $C_{4-20}$ cycloalkyl, $C_{6-24}$ aryl, $C_{7-24}$ alkylaryl and $C_{7-24}$ arylalkyl or two substituents R in the ortho position to one another are attached to form an aromatic or heterocyclic ring containing up to 3 hetero atoms, and Q represents a chemical bond, or O represents —Ar—, —O—, —S—, —SO—, —SO$_2$—, —(CR$_)_m$—, —CO—, —CO—, —Ar—CO—, —CO—NH—, —CO—NH—Ar—NH—CO, where R is as defined above, Ar is a $C_{6-24}$ aromatic radical with two bonds and m is an integer of 1 to 24, and zero to 5 mol-%, based on the sum of the aromatic dihalogen compounds of formula (I) and (II), of an aromatic trihalogen or tetrahalogen compound corresponding to formula (III)

$$ArX_n \qquad (III)$$

in which

Ar is an aromatic or heterocyclic radical containing 6 to 24 ring atoms, up to 3 ring C atoms being replaceable by heteroatoms, X represents halogen, and n is the number 3 or 4, and c) 50 to 100 mol-% alkali sulfide, and 0 to 50 mol-%

TABLE 1

| Example | Melt viscosity $\eta_m$ (Pa · s), 360° C. | Inorgan. Cl (ppm) | % by weight extractable components[1] | $U_1 = \frac{Mw}{Mn} - 1$ | Mol S donor Mol solvent |
|---|---|---|---|---|---|
| 1 | 40 | <5 | 2.1 | 3.52 | 1:1.653 |
| 2 | 58 | <5 | 1.9 | 2.82 | 1:1.062 |
| 3 | 80 | <5 | 1.8 | 3.02 | 1:1.062 |
| Comp. Ex. 1 | 44 | <5 | 3.8 | 4.28 | 1:2.83 |
| Comp. Ex. 2 | 6 | 540 | 2.8 | 4.62 | 1:2.66 |
| Comp. Ex. 3 | 22 | <5 | 4.1 | 4.74 | 1:3.28 |

[1]Chromatographic analysis (HPLC) shows that the components in question are cyclic phenylene sulfide oligomers.

We claim:

1. A process for the production of polyarylene sulfide from a) one or more (hetero)aromatic dihalogen compounds corresponding to formulae (I) or (II)

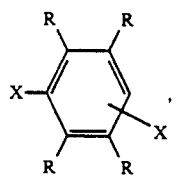

alkali hydrogen sulfide, the molar ratio of (a+b):c being from 0.75:1 to 1.15:1, d) in an organic solvent, optionally in the presence of catalysts or other solvents, wherein the molar ratio of c) to the organic solvent d) is in the range from 1:1.9 to 1:1.0 and the reaction is carried out by mixing of aqueous alkali sulfide or alkali hydrogen sulfide solutions with solutions of the aromatic dihalogen compounds in an organic solvent at temperatures above 212° C., the water content of the reaction solutions does not exceed 0.02% by weight and unreacted aromatic halogen compounds corresponding to formulae (I), (II) and (III) are removed from the reaction mixture either continuously or at the end of the reaction.

2. A process as claimed in claim 1, wherein N-methyl pyrrolidone is the organic solvent.

3. A process as claimed in claim 1, wherein N-methyl caprolactam is the organic solvent.

4. A process as claimed in claim 1, wherein N,N'-dimethyl propyleneurea is the organic solvent.

5. A process as claimed in claim 1, wherein 1,4-dichlorobenzene, 1,3-dichlorobenzene or 2,5-dichlorotoluene the aromatic dihalogen compound of formula (I).

6. A process as claimed in claim 1, wherein 4,4'-dichlorodiphenyl, 4,4'-dichlorodiphenyl sulfone or 4,4'-dichlorobenzophenone is the aromatic halogen compound of formula (II).

7. A process as claimed in claim 1, wherein the aromatic polyhalogen compounds of formula (I), (II) or (III) distilling off azeotropically with the water are continuously returned to the reaction mixture for as long as the aqueous alkali sulfide or alkali hydrogen sulfide solutions are introduced into the reaction solution at temperatures above 212° C. and for as long as the accompanying azeotropic removal of water from the reaction mixture continues.

8. A process according to claim 1 wherein the heteroatoms are N, O, or S.

9. A process according to claim 1 wherein X is bromine or chlorine.

10. A process according to claim 1 wherein the alkali hydrogen sulfide is sodium or potassium hydrogen sulfide.

11. A process according to claim 1 wherein the molar ratio of (a+b):c is from 0.90:1 to 1.1:1.

12. A process according to claim 1 wherein the molar ratio of c) to the organic solvent d) is in the range from 1:1.8 to 1:1.3.

* * * * *